United States Patent
Ljungdahl et al.

(10) Patent No.: US 7,283,479 B2
(45) Date of Patent: Oct. 16, 2007

(54) CABLE TV SYSTEM OR OTHER SIMILAR COMMUNICATION SYSTEM

(75) Inventors: Kjell Arne Ljungdahl, Saltsjoe-Boo (SE); Bo Peter Cullblom, Lidingoe (SE); Lars Ake Peter Carlsson, Saltsjoe-Boo (SE)

(73) Assignee: SpaceNet Proxilliant Systems AB, Nacka Strand (SE)

( * ) Notice: Subject to any disclaimer, the term of this patent is extended or adjusted under 35 U.S.C. 154(b) by 953 days.

(21) Appl. No.: 10/203,935

(22) PCT Filed: Feb. 15, 2001

(86) PCT No.: PCT/SE01/00327

§ 371 (c)(1),
(2), (4) Date: Aug. 16, 2002

(87) PCT Pub. No.: WO01/62003

PCT Pub. Date: Aug. 23, 2001

(65) Prior Publication Data

US 2003/0014765 A1    Jan. 16, 2003

(30) Foreign Application Priority Data

Feb. 16, 2000 (SE) .................................. 0000516

(51) Int. Cl.
*H04L 12/26* (2006.01)
(52) U.S. Cl. ....................................... 370/242; 370/252
(58) Field of Classification Search ........ 370/242–245, 370/248, 252
See application file for complete search history.

(56) References Cited

U.S. PATENT DOCUMENTS 4,520,508 A * 5/1985 Reichert, Jr. ................ 725/125

(Continued)

FOREIGN PATENT DOCUMENTS

EP    549 129 A1    11/1992
EP    859 514 A2    9/1997

OTHER PUBLICATIONS

End-to-end performance measurement for interactive multimediatelevision; Schulmam; Tele-TV Syst., Reston, VA; This paper appears in: Test Conference, 1995. Proceedings., International; Publication Date: Oct. 21-25, 1995; On pp. 979-985; Meeting Date: Oct. 21, 1995-Oct. 25, 1995 Location: Washington, DC, USA.*

(Continued)

*Primary Examiner*—Hassan Kizou
*Assistant Examiner*—Salman Ahmed
(74) *Attorney, Agent, or Firm*—Crowell & Moring LLP

(57) ABSTRACT

A cable TV system, which is arranged to permit a transmission of signals in the return direction from local networks (10), included in the system, to a head end (11) of the system within a predetermined carrier frequency band, serving for the transmission of signals in said direction, comprises means (11', 23) for monitoring the system in respect of disturbances occurring within said carrier frequency band. Said monitoring means (11', 23) comprise detector means (32, 33, 34, 35) within each local network (10) which are arranged to compare the energy level of signals occurring within said carrier frequency band with at least one predetermined reference level and to generate logic signals, depending upon the result of said comparison, and memory means (36) within each local network (10) which are arranged to store information about time intervals during which said energy level exceeds said reference level, derived from the values of said logic signals at different times.

18 Claims, 3 Drawing Sheets

U.S. PATENT DOCUMENTS

Figure 1:
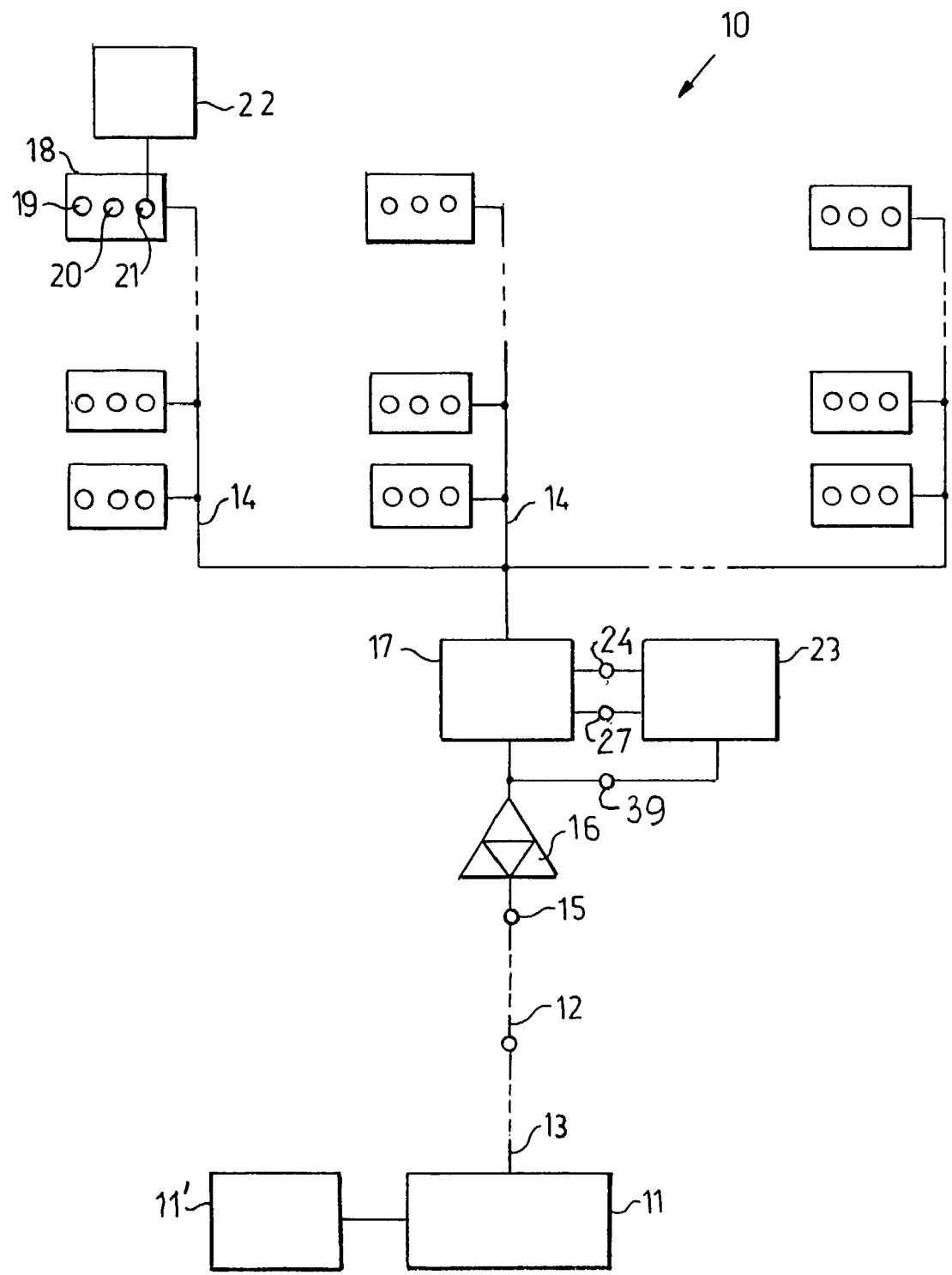

| | | | |
|---|---|---|---|
| 5,126,840 A | 6/1992 | Dufresne et al. | |
| 5,574,748 A * | 11/1996 | Vander Mey et al. | 375/139 |
| 5,712,897 A * | 1/1998 | Ortel | 379/22 |
| 5,719,872 A * | 2/1998 | Dubberly et al. | 370/487 |
| 5,937,330 A * | 8/1999 | Vince et al. | 725/125 |
| 6,291,983 B1 * | 9/2001 | Clarke et al. | 324/102 |
| 6,556,239 B1 * | 4/2003 | Al-Araji et al. | 348/192 |
| 6,559,756 B2 * | 5/2003 | Al-Araji et al. | 340/286.01 |
| 6,859,828 B1 * | 2/2005 | Morgan et al. | 709/224 |
| 2002/0129379 A1 * | 9/2002 | Levinson et al. | 725/129 |
| 2002/0190846 A1 * | 12/2002 | Al-Araji et al. | 340/286.01 |
| 2006/0115058 A1 * | 6/2006 | Alexander et al. | 379/90.01 |

OTHER PUBLICATIONS

Remote monitoring of cable TV headends; Bullinger; This paper appears in: Broadcasting Convention, 1992. IBC., International; Publication Date: Jul. 3-7, 1992; On pp. 246-250; Meeting Date: Jul. 3, 1992-Jul. 7, 1992; Location: Amsterdam, Netherlands.*

Objective-driven monitoring for broadband networks; Mazumdar, S.; Lazar, A.A.; Knowledge and Data Engineering, IEEE Transactions on vol. 8, Issue 3, Jun. 1996 pp. 391-402 .*

* cited by examiner

CABLE TV SYSTEM OR OTHER SIMILAR COMMUNICATION SYSTEM

The present invention relates to a cable TV system or other similar communication system.

More particularly, the invention relates to such a system of the kind which is arranged to permit a transmission of signals in the return direction from local networks, included in the system, to a head end of the system within a predetermined carrier frequency band, serving for the transmission of signals in said direction, and which comprises means for monitoring the system in respect of disturbances occurring within said carrier frequency band.

Cable TV systems of said kind are intended to be used not only for the distribution of TV signals and radio signals from the head end of the system to the subscribers connected to various local networks of the system but also for bi-directional transmission of different kinds of signals between the subscribers and the head end of the system.

In such cable TV systems, within the carrier frequency band utilized for the transmission of signals in the return direction, there may occur severe disturbances due to noise penetrating into the local networks through the subscriber outlets and the lines connected thereto and successively accumulated when passing through the system towards the head end. For this reason, it has been proposed to provide systems of the above kind with means for monitoring the occurrance of disturbances within said carrier frequency band.

In systems previously known, said monitoring has been based either on an accurate measurement at the head end of the magnitude and frequency of all signals within the carrier frequency band in question, incoming to the head end, or on a measurement of the magnitude of signals, occurring under certain predetermined short periods of time, effected through a sampling process. However, in practice, both alternatives are unfavourable and they do not make it possible in an easy manner to determine from which local network disturbances within said frequency band emanate.

The invention therefore has for its purpose to provide an improved communication system of the kind initially specified which facilitates the detection of disturbances occurring within the frequency band of the return channel as well as the identification of the local network from which the disturbances are transmitted.

The system according to the invention proposed for said purpose is primarily characterized in that said monitoring means comprise detector means within each local network which are arranged to compare the energy level of signals occurring within said carrier frequency band with at least one predetermined reference level and to generate logic signals, depending upon the result of said comparison, and memory means within each local network which are arranged to store information about time intervals during which said energy level exceeds said reference level, derived from the values of said logic signals at different times.

The invention makes it possible, within each local network, continuously to detect signals within the frequency band of the return channel, occurring within said network and having an energy level exceeding the reference level and to store information corresponding to the character of said signals for an evaluation thereof later on if and when so required. As a consequence, when disturbances occur within said frequency band, the identification of the local network from which said disturbances emanate will be simplified.

In order to make it possible at the head end of the system to determine from which local network any occurring disturbances emanate, said monitoring means may suitably also comprise means at the head end of the system by which information stored in said memory means of the local networks can be fetched in to the head end for an evaluation thereof at the head end.

Said memory means may be arranged to store information about said time intervals in the form of information about the starting point and the length of each individual interval.

In order to make it possible to reduce the total amount of information that need to be stored in said memory means, said means may however preferably be arranged, at least in respect of certain periods of time, to store information about said time intervals in the form of statistics relating to the number of such intervals occurring during said periods.

Said reference level, which should be lower than the lowest level to which a message signal intended to be transmitted to the head end of the system may be expected to amount, may be adjustable, preferably under the control thereof from the head end of the system. In this case, said memory means may suitably be arranged also to store information about the value of the set reference level.

In order to make it possible to determine and store information relating to the slope of the front edge of signals occurring within said carrier frequency band, said detector means may be arranged to compare the energy level of said signals with at least two different reference levels.

In order to make it possible to monitor the system in a very accurate manner, said detector means may be arranged to effect said comparison and said generation of logic signals, depending upon the result of said comparison, individually for each one of a plurality of different sections of said frequency band, and said memory means may be arranged to store individual information for each of said sections, derived from said signals.

In this case, each local network may comprise a plurality of band-pass filters, which divide said carrier frequency band into a corresponding number of subbands, and a corresponding plurality of detector means, each serving to compare signals occurring within one of said subbands with said reference level or levels, respectively.

Alternatively, each local network may instead comprise a single band-pass filter, having a predetermined pass band width, constituting only a fraction of the total band width of said carrier frequency band, and a single detector means, connected to said filter, in which case the frequency spectrum of the carrier frequency band may be controllably displacable relatively to the pass band of the band-pass filter in order to permit different sections of the carrier frequency band to be placed within said pass band.

In the latter case, it is possible to scan the different sections of the carrier frequency band in a cyclic manner by placing said sections cyclically within the pass band of the band-pass filter.

Compared to the use of a plurality of band-pass filters and a corresponding plurality of detector means, the use of a single band-pass filter and a single detector means and means for controllably displacing the frequency spectrum of the carrier frequency band offers the advantage of making it possible to reduce the costs for the hardware required within each local network while simultaneously also making it possible to divide the carrier frequency band in question into an increased number of smaller sections.

Figure 2:
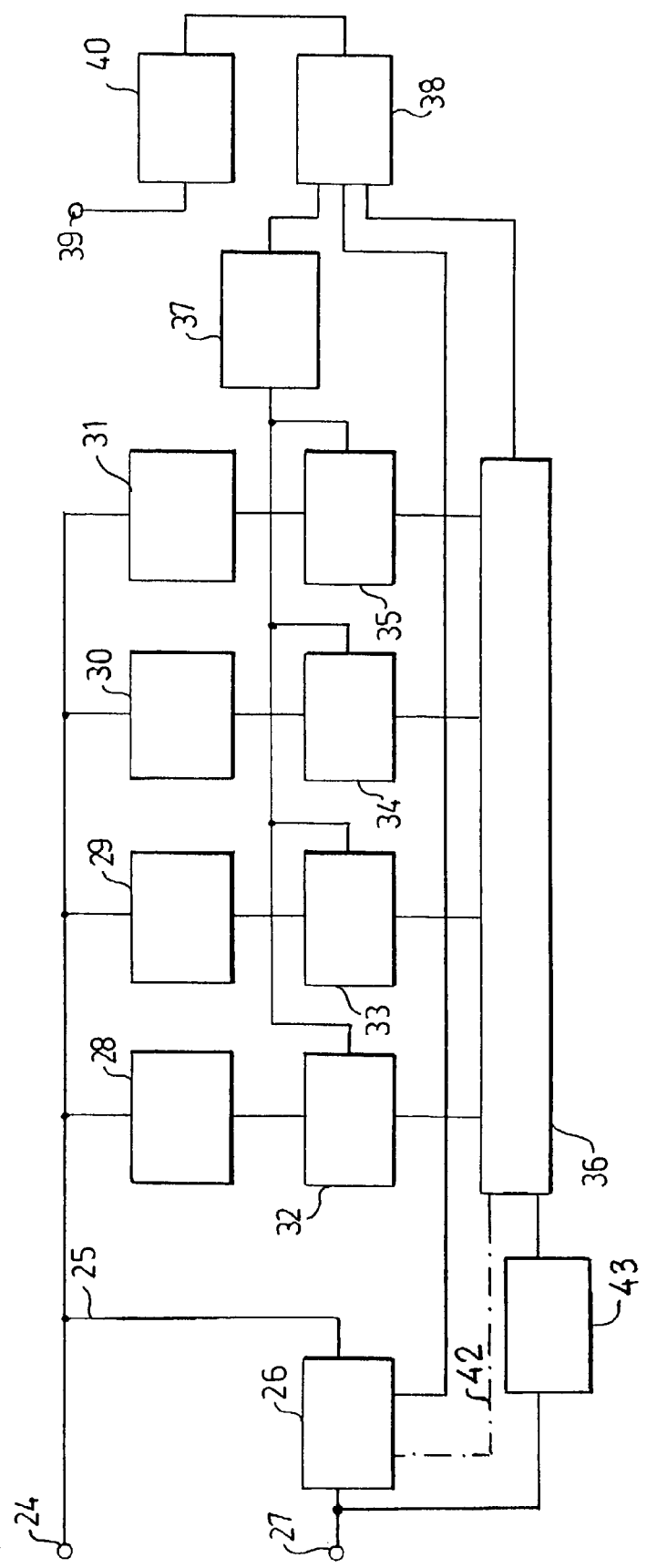
Figure 3:
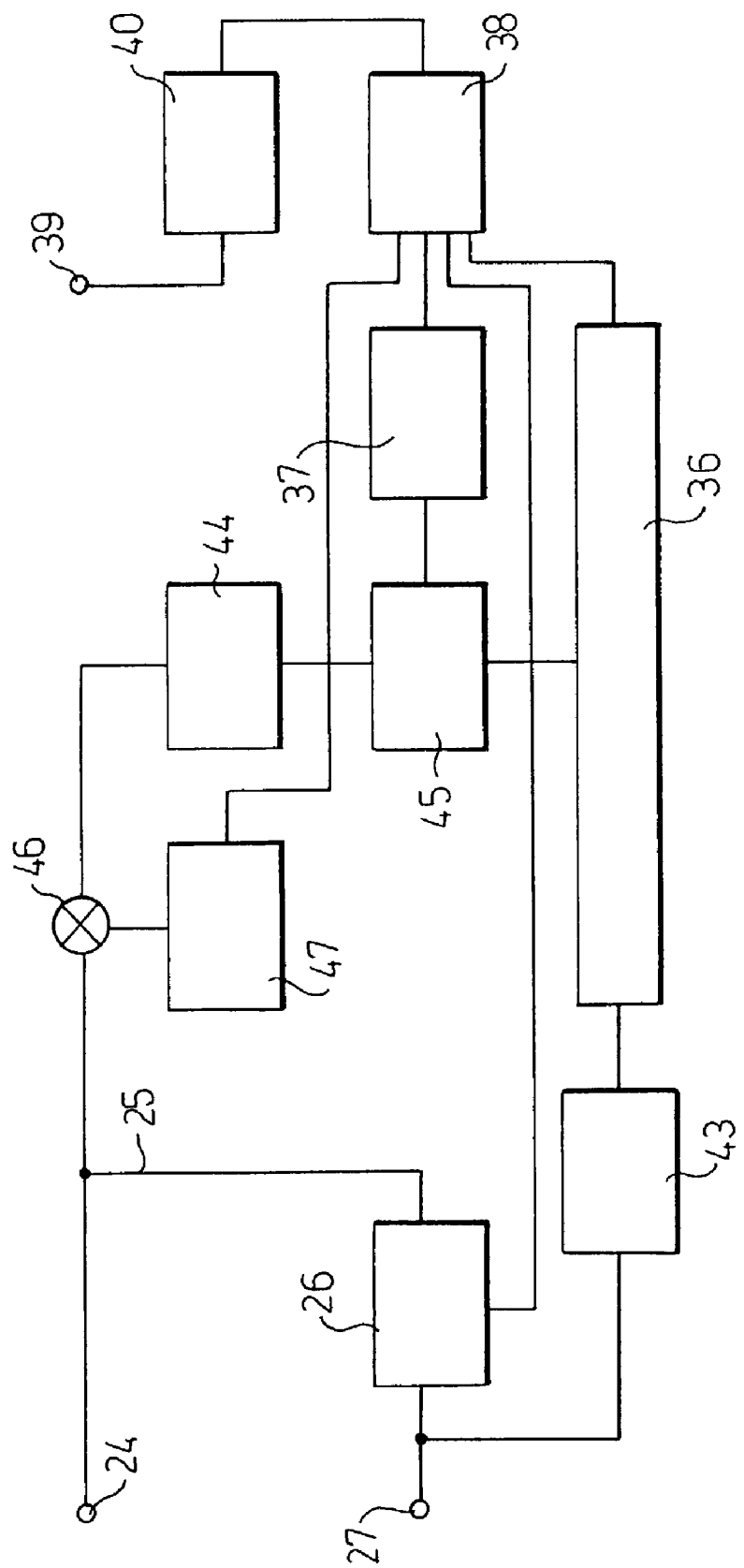

Below the invention is further described with reference to the accompanying drawings, in which:

FIG. 1 shows a principle diagram of a local cable TV network, forming part of a cable TV system according to an embodiment of the invention, selected by way of example only and containing a plurality of such local networks, FIG. 2 shows a detailed block diagram of a monitoring unit, connected in said network and forming part of an equipment for monitoring said system in respect of noise transmitted in the return direction from various local networks, and FIG. 3 shows a detailed block diagram of a monitoring unit according to an alternative embodiment of the invention.

The cable TV network shown in FIG. 1 and generally designated 10 constitutes a local area network, forming part of a cable TV system, including a head end 11 which serves as a communication central and to which network 10 is connected via a diagramatically shown regional network 12 and a trunk network 13, also diagramatically shown and wherein head end 11 is provided.

Network 10 includes a plurality of branch lines 14 which, via a bi-directional amplifier 16 and a diplex filter 17, are connected to a combined input and output 15 of network 10 which, in its turn, is connected to network 12. Each branch line 14 has a plurality of subscriber outlet boxes 18, connected thereto, each comprising three different outlets, namely a TV antenna outlet 19, a radio antenna outlet 20 and a data terminal outlet 21.

In known manner, the illustrated TV system utilizes different carrier frequency bands for the transmission of different kinds of signals and signals in different directions between head end 11 and outlet boxes 18. Below, it is assumed that the system utilizes a first lower carrier frequency band b1, e.g. 15-65 MHz, for the transmission of data signals in the return direction, i.e. from data terminals 22, connected to outlets 21, to head end 11, while it utilizes a second higher carrier frequency band b2, e.g. 120-127 MHz, for the transmission of data signals in a forward direction, i.e. from head end 11 to data terminals 22, and two further carrier frequency bands b3 and b4, e.g. 88-108 MHz and 130-860 MHz, respectively, for the transmission of radio signals and TV signals from the head end to the subscriber outlets.

In order to make it possible to monitor network 10 in respect of noise within carrier frequency band b1, i.e. within the carrier frequency band serving for the transmission of data signals in the return direction, transmitted from said network to network 12 via the combined input and output 15, network 10 is provided with a special noise monitoring unit 23, the more detailed structure of which appears from FIG. 2.

Unit 23 comprises an input 24, connected to diplex filter 17 and arranged to receive signals within frequency band b1 incoming to said filter from lines 14, and a line 25, having its one end connected to input 24 and containing a controllable blocking circuit 26. If permitted to pass through blocking circuit 26, the signals received at input 24 can be delivered from line 25 to an output 27 of unit 23, connected to filter 17, in order then, via said filter and amplifier 16, to pass further in the return direction to output 15 of network 10 and then to head end 11.

In FIG. 2, reference numeral 28, 29, 30 and 31 designate four band-pass filters which are connected to input 24 and have mutually different pass bands, located next to each other, and which serve to divide the signals incoming via input 24 on four subbands, together covering the entire frequency band b1. Furthermore, reference numeral 32, 33, 34 and 35 designate four detectors which are connected each to the output of one of said filters and which serve to compare the energy level of the output signal from the corresponding filter with at least one predetermined reference level and to deliver logic signals, depending upon the result of said comparison, to a unit 36.

Unit 36 contains memory means which are arranged, individually for each of said subbands, to store information about the time intervals, during which said energy level exceeds said reference level, derived from the values of said logic signal at different times. For the purpose of generating and supplying said reference level to the different detectors, there is provided a reference level generator 37.

Unit 36, which may contain a processor for processing the incoming logic signals, may be arranged to store, in a memory of said unit, information about said time intervals in the form of information about the starting point and the length of each of said time intervals. However, unit 36 may also be arranged to store said information in any other form, preferably in the form of statistics relating to the number of time intervals of the abovementioned kind occurring during certain periods of time. With the aid of means provided at head end 11, the information stored in unit 36 may be fetched in to the head end for subsequent evalutation thereof at said end whenever so desired. Said means may preferably comprise a computer 11' at the head end by means of which a process for fetching in information to the head end may be ordered and the information fetched in may be evaluated.

In addition, unit 36 may be arranged to serve as a control unit for blocking circuit 26. In a manner described more in detail in Swedish patent application No. 99 04589-0, unit 36 may in this case be arranged to determine whether the received logic signals satisfy certain conditions previously stored in said unit and, via a line 42, indicated by a dash-dotted line, to deliver to blocking circuit 26 a control signal for closing the signal path through said circuit from input 24 to output 27 only when the logic signals received by unit 36 satisfy said conditions. In this case, unit 23 will also function as a noise reduction unit built-in in the network.

The band width of band-pass filters 32-35 may preferably be selected in such a manner that the energy level that can be expected to arise from, based on experience, normally appearing disturbances will be approximately equal within the different pass bands. This means that filters having lower pass band frequencies should normally have less band width than filters having higher pass band frequencies.

In order to make it possible, from head end 11, to order an operation for fetching in information stored in unit 36, a reprogramming of the processor contained in said unit, an adjustment of the magnitude of the reference level generated by generator 37 or a temporary compulsory blocking or a temporary compulsory closing of the signal path through blocking circuit 26, there is provided a demodulator 38 to which control commands transmitted from head end 11 within frequency band b2 may be supplied via an input 39, connected to the junction line between amplifier 16 and diplex filter 17, and a band-pass filter 40, connected to said input. From unit 36, the information stored in said unit may be transmitted to output 27 via a modulator 43 in which said information is modulated on a carrier, the frequency of which may lie between the two frequency bands b1 and b2.

The manner of operation of the system above described may be summarized as follows. By means of the four filters 28-31, a signal within frequency band b1 incoming to unit 23 via input 24 is divided into four different subbands. The portion of the signal falling within a certain subband is supplied to the detector 32, 33, 34 or 35, respectively, connected to the filter in question. The detector compares the energy level of the incoming signal with at least one reference level and delivers a logic signal depending upon said comparison to unit 36. In the processor contained in unit 36, the logic signals delivered from the different detectors are subjected to the required processing to generate the desired information which is then stored in the memory contained in said unit.

When a corresponding control command is supplied to unit 36 from head end 11 via input 39, filter 40 and demodulator 38, said information may then be delivered to the head end via modulator 43 and output 27. In the head end, the fetched in information may then be evaluated in order to determine any required measures. If said evaluation proves that network 10 delivers unacceptably high disturbances, it is then possible from the head end to command a compulsory activation of the blocking function of blocking circuit 26 in order hereby to prevent any continued transmission of signals within carrier frequency band b1 from network 10 until the cause of said disturbances has been eliminated.

Above it has been assumed that each detector 32, 33, 34 and 35, respectively, is arranged to compare the energy level of the signal incoming to the detector from the corresponding filter 28, 29, 30 or 31, respectively, with a single reference level. However, each detector may be arranged to compare said energy level with two different reference levels in order hereby to make it possible also to determine the slope of the front edge of each signal incoming to the detector and to store the corresponding information in unit 36.

Unit 36 may also be arranged to effect a certain evaluation of the information stored therein. For instance, it may be arranged to trigger and send an alarm signal to the head end when said evaluation proves that obviously impermissible conditions exist in network 10.

In FIG. 3, components of the embodiment of unit 23 shown therein which correspond to components of the above-described embodiment according to FIG. 2 have been provided with the same reference numerals as in FIG. 2.

The embodiment according to FIG. 3 differs from the embodiment according to FIG. 2 primarily in that, instead of the different band-pass filters 28, 29, 30 and 31 and the different detectors 32, 33, 34 and 35, connected to said filters, it contains a single band-pass filter 44 and a detector 45, connected to the output of said filter. Furthermore, between input 24 and filter 44, there is provided a mixer 46 which is connected also to an oscillator 47, arranged to deliver a signal of an adjustable frequency to the mixer. Hereby, filter 44 can be supplied with a signal corresponding to the signal at input 24 but having a frequency spectrum that is displaced in relation to said signal in dependence upon the set frequency of the output signal from oscillator 47. The setting of the frequency of the output signal from the oscillator may be controlled from head end 11 of the cable TV system via input 39, filter 40 and demodulator 38. The band width of filter 44 should constitute only a small fraction of the total band width of carrier frequency band b1 and, if band b1 covers the frequency range above mentioned by way of example, i.e. 15-65 MHz, it may for instance amount to 5 MHz.

As a consequence of the composition of unit 23 above described, it is possible by controlling the frequency of the output signal from oscillator 47 to displace the frequency spectrum of carrier frequency band b1 in relation to the pass band of band-pass filter 44 in such a manner that different sections of said frequency band will be placed within the pass band of the filter. Hereby, the different sections of carrier frequency band b1 may be scanned in a cyclic fashion by cyclically placing them one at a time within the pass band of filter 44. However, when desired, said cyclic scanning may be interrupted temporarily for a more detailed investigation of the character of signals occurring within a certain section of said frequency band.

One feasible manner of detecting whether a signal occurring within frequency band b1 constitutes a communication signal or a disturbance signal is to detect whether the signal contains an acceptable preamble. However, in this case, it is necessary that the detector means contained in the local networks are capable of reacting sufficiently rapidly.

The invention is not restricted to the embodiments above described and shown in the drawings. Instead, many other embodiments are feasible within the scope of the invention as defined in the following claims.

The invention claimed is:

1. A communication system comprising:
   a plurality of local networks;
   a head end connected to the local networks, wherein signals are transmittable from the local networks to the head end within a predetermined carrier frequency band; and
   a monitor arrangement configured to monitor disturbances within the carrier frequency band, the monitor arrangement including:
      a detector arrangement within each local network, each detector arrangement being configured to compare an energy level of signals occurring within the carrier frequency band with a predetermined reference level and to generate logic signals relating to the result of the comparison,
      a memory device within each local network, each memory device being configured to store information derived from the values of the logic signals about time intervals during which the energy level exceeds the reference level, and
      an element placed at the head end, the element being configured to fetch the information stored in the memory devices into the head end for evaluation at the head end;
   wherein the memory devices are configured to store the information about the time intervals in the form of information about the length of each individual interval; and
   wherein the memory devices are configured, at least in respect of certain periods of time, to store information about the time intervals in the form of statistics relating to the number of the intervals occurring during the periods.

2. The communication system according to claim 1, wherein the reference level is adjustable by the head end.

3. The communication system according to claim 2, wherein the memory devices are configured also to store information about the value of the reference level.

4. The communication system according to claim 1, wherein the detector arrangements are configured to compare the energy level with at least two different reference levels.

5. The communication system according to claim 1, wherein the detector arrangements are configured to effect the comparison and the generation of logic signals, depending upon the result of the comparison, individually for each one of a plurality of different sections of the frequency band and wherein the memory devices are configured to store individual information for each of the sections derived from the logic signals.

6. The communication system according to claim 5, wherein each local network comprises a plurality of band-pass filters, which divide the carrier frequency band into a corresponding number of subbands, and a corresponding plurality of detectors, each serving to compare signals occurring within one of the subbands with the reference level.

7. The communication system according to claim 1, wherein the memory devices are configured, at least in respect of certain periods of time, to store information about the time intervals in the form of statistics relating to the number of the intervals occurring during the periods.

8. The communication system according to claim 7, wherein the reference level is adjustable by the head end.

9. The communication system according to claim 8, wherein the memory devices are configured also to store information about the value of the reference level.

10. The communication system according to claim 7, wherein the detector arrangements are configured to compare the energy level with at least two different reference levels.

11. The communication system according to claim 7, wherein the detector arrangements are configured to effect the comparison and the generation of logic signals, depending upon the result of the comparison, individually for each one of a plurality of different sections of the frequency band and wherein the memory devices are configured to store individual information for each of the sections derived from the logic signals.

12. The communication system according to claim 11, wherein each local network comprises a plurality of band-pass filters, which divide the carrier frequency band into a corresponding number of subbands, and a corresponding plurality of detectors, each serving to compare signals occurring within one of the subbands with the respective reference levels.

13. A communication system comprising:
a plurality of local networks;
a head end connected to the local networks, wherein signals are transmittable from the local networks to the head end within a predetermined carrier frequency band; and
a monitor arrangement configured to monitor disturbances within the carrier frequency band, the monitor arrangement including:
a detector arrangement within each local network, each detector arrangement being configured to compare an energy level of signals occurring within the carrier frequency band with a predetermined reference level and to generate logic signals relating to the result of the comparison,
a memory device within each local network, each memory device being configured to store information derived from the values of the logic signals about time intervals during which the energy level exceeds the reference level, and
an element placed at the head end, the element being configured to fetch the information stored in the memory devices into the head end for evaluation at the head end,
wherein the memory devices are configured to store the information about the time intervals in the form of information about the starting point and the length of each individual interval.

14. The communication system according to claim 13, wherein the memory devices are configured, at least in respect of certain periods of time, to store information about the time intervals in the form of statistics relating to the number of the intervals occurring during the periods.

15. A communication system comprising:
a plurality of local networks;
a head end connected to the local networks, wherein signals are transmittable from the local networks to the head end within a predetermined carrier frequency band; and
a monitor arrangement configured to monitor disturbances within the carrier frequency band, the monitor arrangement including:
a detector arrangement within each local network, each detector arrangement being configured to compare an energy level of signals occurring within the carrier frequency band with a predetermined reference level and to generate logic signals relating to the result of the comparison,
a memory device within each local network, each memory device being configured to store information derived from the values of the logic signals about time intervals during which the energy level exceeds the reference level, and
an element placed at the head end, the element being configured to fetch the information stored in the memory devices into the head end for evaluation at the head end;
wherein the detector arrangements are configured to effect the comparison and the generation of logic signals, depending upon the result of the comparison, individually for each one of a plurality of different sections of the frequency band and wherein the memory devices are configured to store individual information for each of the sections derived from the logic signals, and
wherein each local network comprises a single band-pass filter that has a predetermined pass band width which constitutes only a fraction of the total band width of the carrier frequency band, and a single detector connected to the filter, the frequency spectrum of the carrier frequency band being controllably displaceble relatively to the pass band of the band-pass filter in order to permit different sections of the carrier frequency band to be placed within the pass band.

16. The communication system according to claim 15, wherein the carrier frequency band is arranged to have different sections thereof cyclically placed within the pass band of the band-pass filter.

17. A communication system comprising:
a plurality of local networks;
a head end connected to the local networks, wherein signals are transmittable from the local networks to the head end within a predetermined carrier frequency band; and
a monitor arrangement configured to monitor disturbances within the carrier frequency band, the monitor arrangement including:
a detector arrangement within each local network, each detector arrangement being configured to compare an energy level of signals occurring within the carrier frequency band with a predetermined reference level and to generate logic signals relating to the result of the comparison,
a memory device within each local network, each memory device being configured to store information derived from the values of the logic signals about time intervals during which the energy level exceeds the reference level, and an element placed at the head end, the element being configured to fetch the information stored in the memory devices into the head end for evaluation at the head end;

wherein the memory devices are configured, at least in respect of certain periods of time, to store information about the time intervals in the form of statistics relating to the number of the intervals occurring during the periods;

wherein the detector arrangements are configured to effect the comparison and the generation of logic signals, depending upon the result of the comparison, individually for each one of a plurality of different sections of the frequency band and wherein the memory devices are configured to store individual information for each of the sections derived from the logic signals; and wherein each local network comprises a single band-pass filter that has a predetermined pass band width which constitutes only a fraction of the total band width of the carrier frequency band, and a single detector connected to the filter, the frequency spectrum of the carrier frequency band being controllably displaceble relatively to the pass band of the band-pass filter in order to permit different sections of the carrier frequency band to be placed within the pass band.

18. The communication system according to claim 17, wherein the carrier frequency band is arranged to have different sections thereof cyclically placed within the pass band of the band-pass filter.

* * * * *